United States Patent Office 3,511,814
Patented May 12, 1970

3,511,814
CURING METHOD
Junji Ogura, Minoo, Noritoshi Mise, Ikeda, Makoto Yokoo, Toyonaka, and Yoshihiro Hatanaka, Osaka, Japan, assignors to Takeda Chemical Industries, Ltd., Osaka, Japan
No Drawing. Original application May 1, 1967, Ser. No. 634,883, now Patent No. 3,478,089, dated Nov. 11, 1969. Divided and this application Oct. 2, 1968, Ser. No. 764,647
Claims priority, application Japan, May 6, 1966, 41/28,816
Int. Cl. C08g 53/08, 22/44, 51/84
U.S. Cl. 260—77.5               7 Claims

ABSTRACT OF THE DISCLOSURE

A polyisocyanate component is cured at room temperature by using, as a curing agent, a carboxylic acid salt of hexamethylenediamine or an aromatic diamine which salt is in a liquid state at temperatures below 35° C. The salts are also provided.

---

This application is a divisional application of copending application Ser. No. 634,883, filed May 1, 1967, now U.S. Pat. 3,478,089.

This invention relates to a method for curing an isocyanate component and to a curing agent therefor. More specifically the invention concerns the method for curing a polyisocyanate component at room temperature, employing as a curing agent, carboxylic acid salt of hexamethylene diamine or aromatic diamines, the salt being a liquid at temperatures below 35° C.

Recently, polyurethanes have gained use in a variety of fields, but there still remains room for improvement in the properties thereof. For example, although polyurethane elastomer has been widely applied to various kinds of technical fields due to its excellent properties such as remarkable abrasion resistance, tensile, strength, elasticity, tear strength, and high resistance to oxygen, alkali and acid, etc., there is a problem in connection with the curing agents for them. The most typical curing agents for producing polyurethane elastomers are polyols, diamines and water. However, when polyols or water is used as the curing agent, the curing proceeds very slowly except when accelerated by heating or by addition of accelerator, and furthermore the resulting product is not as hard as the one obtained when using diamines as curing agent. While, when lower aliphatic diamines such as ethylene diamine are used, the curing reaction is so fast that they do not appear to be of practical significance. And when other higher aliphatic diamines or aromatic diamines, which have been commonly used as curing agents, are employed, heating at a rather high temperature, for example higher than 100° C., is necessarily required for conducting the curing process, and, further, the pot-life is also very short.

Therefore, these hitherto-known techniques for curing cannot effectively be applied to applications such as coating or lining of floor, wall, plants of chemical industry, sealing or caulking applications, etc.

According to the present invention, it is found that by the use of carboxylic acid salts of hexamethylene diamine or aromatic diamines, which salts are in a liquid state at temperatures below 35° C., a polyisocyanate component can be moderately cured at room temperature, to give a cured product having the characteristics obtained with diamine curing.

It is an object of the present invention to provide a novel curing method for an isocyanate component, which comprises allowing a carboxylic acid salt of hexamethylene diamine or aromatic diamine which is liquid at below 35° C. to act upon isocyanate component at about room temperature.

Another object of the present invention is to provide a novel curing method for an isocyanate component, which is advantageously applicable to such a field as coating or lining of floors, wall, chemical plants, etc., sealing or caulking applications.

Further objects of this invention are to provide novel salts of hexamethylene diamine or aromatic diamine, which salts are liquid at temperatures below 35° C. and which may be employed as a curing agent at room temperature for an isocyanate component.

Other objects will become apparent from the detailed descriptions hereinafter provided.

The curing agents of the present invention are selected from carboxylic acid salts of hexamethylene diamine or aromatic diamines which are liquid at temperatures below 35° C., the diamines being compounds such as 4,4'-methylene-bis-(2-chloroaniline), tolylenediamine, etc., and the carboxylic acid used to form a salt with the diamine, being compounds such as maleic acid, lactic acid, acrylic acid, adipic acid, etc. As the carboxylic acid, suitable compounds include carboxylic acid esters having at least one carboxyl radical, which may be prepared from a polycarboxylic acid and polyetherpolyol. Preferred is the carboxylic acid salt of hexamethylene diamine or an aromatic diamine, which salt is in a liquid state at temperatures below 35° C., desirably below 25° C., and may be exemplified by mono- or di-lactate of 4,4'-methylene-bis-(2-chloroaniline), diacrylate of 4,4'-methylene-bis-(2-chloroaniline), mono- or di-maleate of 4,4'-methylene-bis-(2-chloroaniline), dilactate of hexamethylenediamine, mono- or di-maleate of tolylenediamine, a salt of 4,4'-methylene-bis-(2-chloroaniline) and monocarboxylic acid monoester prepared from maleic acid and polypropylene glycol (molecular weight, about 300–3000). In these salts, a ratio of amino radical of carboxylic acid is not necessarily strictly 1:1, but such salts may be employed as are produced by a reaction between a carboxylic acid and a diamine in an optional ratio of carbonyl radical relative to amine as long as the salt is a liquid at temperatures below 35° C.

These salts may be prepared in a conventional manner, and a preferred one is as follows: In a solution of 13 kg. of 4,4'-methylene-bis-(2-chloroaniline) in 14 kg. of acetone is further dissolved 9 kg. of lactic under stirring. The resultant solution is subjected to distillation to remove acetone to give 22 kg. of dilactate of 4,4'-methylene-bis-(2-chloroaniline) as deep, red-brown. Density: 1.3 (25° C.). Viscosity: about 200,000 centipoises.

All of the other salts employable in the present invention may be prepared in a similar manner to the above.

The carboxylic acid salt of the diamine employable in the present invention is not necessarily in a purified state, but there may be also effectively used, for example, a reaction mixture of the carboxylic acid and the diamine as is, without being subjected to a purification process, or a product prepared by merely removing an excess reaction solvent from a whole reaction mixture of the carboxylic acid and the diamine. From a practical viewpoint, the carboxylic acid salt of the diamine is desired to be a liquid even at 10° C., and more preferably, at a temperature as low as 0° C.

These curing agents may be employed singly or in combination of two or more of them or with any other curing agent such as polyol, etc.

The isocyanate component to which the present invention is applicable may be exemplified by diisocyanates (e.g. aromatic diisocyanates) such as tolylene diisocyanate, $\omega,\omega'$-diisocyanate dimethyl benzene, diphenylmethane diisocyanate, naphthalene diisocyanate, etc., or aliphatic diisocyanates such as hexamethylene diisocyanate, tetramethylene diisocyanate, etc. or so-called polyisocyanate-polyol prepolymer having terminal isocyanate radicals, which is prepared by the reaction of an excess amount of the diisocyanates mentioned above and the conventional low molecular polyol (e.g. glycerine, trimethylol propane, hexanetriol, ethylene glycol, propylene glycol, diethyene glycol, sorbitol, mannitol, sucrose, etc.), polyesterpolyol which is prepared by a reaction between polycarboxylic acid and glycol, polyetherpolyol which may be prepared by addition polymerization of alkylene oxide to the low molecular polyol as mentioned above, or caster oil. Further, the isocyanate component may involve, if necessary, additive components, for example, a blowing agent, foam stabilizer (e.g. silicon oil, surfactant), paint, reinforcing material, pigment, dye, antioxidant, fire-proofing agent, filler, etc.

The curing process of the present invention may proceed by mixing in a conventional manner at room temperature an isocyanate component and the carboxylic acid salt of hexamethylenediamine or an aromatic diamine, and, if necessary, together with one or more of other components, for example, a blowing agent, foam stabilizer (e.g. silicon oil, surfactant), paints, reinforcing material, pigment, dye, antioxidant, fire-proofing agent, filler and other additives. The pot life of the mixture may be varied widely, for example 3 minutes to 24 hours by the combination of the isocyanate component with the carboxylic acid salt of a diamine or by changing the amount of the carboxylic acid salt to be added.

The mixture is easily cured at room temperature to give cured hard product usually in several hours after its application. The curing time, if desired, may be shortened by heating. It is desirable that the mixture be kept standing for several days at room temperature to complete the curing.

The present curing method is applicable to coating, molding, sealings or caulking etc., especially cold setting applications.

For example, the mixture of the isocyanate component and the carboxylic acid salts of hexamethylenediamine or aromatic diamines, and, if desired, other additives, is, within its pot-life, poured into suitable mould, or coated on a floor, wall or a surface of apparatus, etc., or sealed or caulked into a suitable object, followed by allowing the mixture to stand at room temperature.

It is to be understood that the following examples are solely for the purpose of illustration and not to be construed as limitations of this invention, and that many variations may be resorted to without departing from the spirit and scope of this invention. In examples, "g.," "kg.," "cm." and "mm." are "gram," "kilogram," "centimeter" and "millimeter," respectively. Temperatures are all uncorrected, and percentage are all on the weight basis.

EXAMPLE 1

Polyoxypropylene glycol (molecular weight; about 1000) is allowed to react with tolylene diisocyanate (a mixture of 80% of 2,4-tolylene diisocyanate and 20% of 2,6-tolylene diisocyanate) in a molar ratio of NCO/OH of about 2, to obtain 100 weight parts of polyisocyanate prepolymer (amine equivalent: 720). With the prepolymer is admixed 20 weight parts of di-lactate of 4,4'-methylene bis-(2-chloroaniline), and the mixture is poured into a frame of 2 mm. height placed on a glass plate. The applied mixture loses its fluidity after 10 minutes and then is gradually hardened with foaming. After standing for several hours at room temperature, a nontacky hard cured product is obtained. The thus obtained cured product is kept standing for 10 days at 25° C. under 50% relative humidity and its physical properties determined: density about 0.5; tensile strength 30 kg./cm.$^2$; and elongation 300%.

EXAMPLE 2

With 100 weight parts of the prepolymer prepared in the same manner as in Example 1, are admixed 20 weight parts of dilactate of 4,4'-methylene-bis-(2-chloroaniline) and 3 weight parts of strontium hydroxide at room temperature, and the mixture is poured into a frame of 2 mm. height placed on the glass plate. The applied mixture loses its fluidity after 5 minutes, and then hardens after 20 minutes. The hardened product is kept standing for 6 days at 25° C. under 50% relative humidity, and then its physical properties are determined: hardness (Shore A) 70; tensile strength 100 kg./cm.$^2$; and elongation 400%.

EXAMPLE 3

With 100 weight parts of the prepolymer prepared in the same manner as in Example 1, is admixed 19.2 weight parts of dilactate of hexamethylene diamine at room temperature. The thus obtained mixture can be stored for more than 24 hours in a liquid state. The mixture is poured into a frame of 2 mm. height placed on a glass plate. After 3 days the applied mixture is hardened. The hardened product is allowed to stand for 2 weeks at 20° C., followed by measuring its physical properties: hardness (Shore A) 23; tensile 7 kg./cm.$^2$; and elongation 500%.

EXAMPLE 4

With 100 weight parts of the prepolymer prepared in the same manner as in Example 1, is admixed 9.6 weight parts of dilactate of hexamethylene diamine at room temperature. The obtained mixture can be stored for more than 24 hours in a liquid state. The mixture is poured into a frame of 2 mm. height placed on a glass plate. After 3 days, the mixture is hardened, and the hardened product is allowed to stand for 2 weeks, followed by measuring its physical properties: density 0.6 tensile strength 5 kg./cm.$^2$; and elongation higher than 800%.

EXAMPLE 5

One mol of polyoxypropylenetriol (molecular weight; about 3000) is reacted with 3 mol of tolylene diisocyanate (a mixture of 80% of 2,4-isomer and 20% of 2,6-isomer) to obtain a prepolymer of amine equivalent of 1200. With 100 parts of the prepolymer is admixed 20 weight parts of dilactate of 4,4'-methylene-bis-(2-chloroaniline) at room temperature. There occurs a gelation of the mixture after 40 minutes to one hour at room temperature. A hardened product produced by keeping standing the mixture for 6 days at room temperature has the following characteristics: hardness (Shore A) 63; tensile strength 44 kg./cm.$^2$; and elongation 160%.

EXAMPLE 6

With 100 weight parts of the prepolymer prepared in the same manner as in Example 1, are admixed 15 weight parts of dilactate of 4,4'-methylene-bis-(2-chloroaniline)

and 2 weight parts of diethylene glycol at room temperature. The mixture begins to cure with an occurrence of gelation after about 20 minutes and then hardens gradually. A hardened product obtained by keeping standing for 6 days at room temperature, has the following characteristics: hardness (Shore A) 55; tensile strength 50 kg./cm.$^2$; and elongation 350%.

EXAMPLE 7

Polyoxypropylene triol (molecular weight; about 3000) is allowed to react with tolylene diisocyanate (a mixture of 80% of 2,4-isomer and 20% of 2,6-isomer) in a molar ratio of NCO/OH=2, to obtain polyisocyanate prepolymer (amine equivalent: 1200). 100 weight parts of the prepolymer is mixed with 84 weight parts of talc and 3 weight parts of supermicroscopic silica ("Airosil"); by a kneader to obtain a compound. To 100 weight parts of the compound is admixed 10 weight parts of dilactate of 4,4'-methylene-bis-(2-chloroaniline), and the mixture is applied uniformly on a floor of cement-mortar. After 5 hours, the applied mixture is hardened to give the floor coating having good elasticity and good touch.

Alternatively, the above-mentioned compound is hardened in the same manner as in Example 1 to give a hardened sheet, which has the following characteristics:

|  | Hardened sheet | Control (vinylasbestos tile) |
|---|---|---|
| Tensile strength (kg./cm.$^2$) | 40 | 10 |
| Elongation at break (percent) | 200 | 30 |
| Abrasion resistance (Taber type CS-17 wheel) (g. lost/1,000 cycles) | 0.42 | 0.61 |
| Alkali resistance (1% NaOH, 25° C., 1 week dip) | ($^1$) | ($^1$) |
| Acid resistance (5% H$_2$SO$_4$, 25° C., 1 week dip) | $^2$3.7 | $^2$27.9 |

$^1$ Unchanged.
$^2$ Percent wt. increase.

The control (vinylasbestos tile) is extremely hydrophobic and, therefore, when coated on the floor, it is inclined to make moisture stagnate between the floor and coated sheet, while the hardened sheet of this example has no such defect at all, since it has an ability to take up and discharge moisture.

EXAMPLE 8

With 100 weight parts of prepolymer prepared in the same manner as in Example 5, is admixed 10 weight parts of dilactate of hexamethylene diamine at room temperature. The obtained mixture can be stored for longer than 24 hours in a liquid state. The mixture is poured into a frame of 2 mm. height placed on a glass plate and kept standing at room temperature. It is hardened after 3 days and then kept standing for further 2 weeks, followed by measuring its physical properties. The results are as follows: hardness (Shore A) 40; tensile strength 7 kg./cm.$^2$; and elongation: 180%.

EXAMPLE 9

With 100 weight parts of the prepolymer prepared in the same manner as in Example 1, is admixed 73 weight parts of a monosalt of 4,4'-methylene-bis-(2-chloroaniline) with monocarboxylic acid monoester prepared from maleic acid and polyoxypropylene glycol (molecular weight; about 300). The mixture is poured into a frame of 2 mm. height placed on a glass plate. The applied mixture is gelled after about 35 minutes and further kept standing for 6 days at room temperature, followed by measuring its physical properties. The results are as follows: hardness (Shore A) 60; tensile strength 45 kg./cm.$^2$; elongation 300%. No foam is found in the product.

EXAMPLE 10

With 100 weight parts of the prepolymer prepared by the same manner as in Example 1, is admixed 25 weight parts of monolactate of 4,4'-methylene-bis-(2-chloroaniline). The resultant mixture is poured into a frame of 2 mm. height placed on the glass plate. The applied mixture loses its fluidity and is hardened gradually. After kept standing for several hours at room temperature, a non-tacky hardened product is obtained. The hardened product is kept standing for 10 days at 25° C. under 50% relative humidity to give a completely cured product having the following characteristics: hardness (Shore A) 80; tensile strength 40 kg./cm.$^2$; and elongation 200%.

EXAMPLE 11

In the manner described in Example 10 a salt prepared from 1 mole of 4,4'-methylene-bis-(2-chloroaniline) and 2 moles of maleic monoester of polyoxypropylene glycol (molecular weight: about 300) is used instead of a salt of 4,4'-methylene-bis-(2-chloroaniline) with mono-maleic monoester of polyoxypropylene glycol to give a cured product having the following characteristics: tensile strength 10 kg./cm.$^2$; hardness (Shore A) 60; and elongation 300%.

EXAMPLE 12

With 120 weight parts of prepolymer prepared in the same manner as in Example 8 is admixed 20 weight parts of di-acrylate of 4,4'-methylene-bis-(2 - chloroaniline) at room temperature and the mixture is kept standing for 2 weeks at 25° C. on a glass plate. The hardened product shows the following properties: tensile strength 30 kg./cm.$^2$; and elongation 100%.

EXAMPLE 13

With 100 weight parts of prepolymer prepared in the same manner as in Example 1, is admixed at room temperature 16.5 weight parts of a salt prepared from 1 mol of 2,4-tolylene diamine and 1 mol of maleic acid. The mixture is gelled after 3 minutes at room temperature and hardened gradually. After kept standing at room temperature for 6 days, the product shows the following properties: hardness (Shore A) 60; tensile strength 70 kg./cm.$^2$; and elongation 300%.

EXAMPLE 14

With 100 weight parts of prepolymer prepared in the same manner as in Example 1 is admixed at room temperature 10.9 weight parts of a salt prepared from 1 mol of 2,4-tolylene diamine and 1 mol of maleic acid. The mixture begins to harden with foaming after 3 minutes and is further kept standing at room temperature for 6 days to give the product having the following properties: density 0.5; tensile strength 20 kg./cm.$^2$; and elongation 180%.

EXAMPLE 15

With 100 weight parts of prepolymer prepared in the same manner as in Example 1 is admixed 8.3 weight parts of a salt prepared from 2 mol of 2,4-tolylene diamine and 1 mol of maleic acid at 35° C. The mixture gelled after 2 minutes and begins to harden. After kept standing at room temperature for 6 days, the product shows the following properties: hardness (Shore A) 65; tensile strength 17 kg./cm.$^2$; and elongation: 220%.

What is claimed is:
1. A method for curing an organic polyisocyanate component, which comprises allowing a carboxylic acid salt of hexamethylene diamine or of an aromatic diamine said salt being liquid at temperatures below 35° C., to react with said organic polyisocyanate component at room temperature.

2. A method as in claim 1 wherein the carboxylic acid salt of diamine is selected from the group consisting of mono- or di-lactate of 4,4' - methylene-bis - (2-chloroaniline), diacrylate of 4,4'-methylene-bis-(2 - chloroaniline), mono- or di-maleate of 4,4'-methylene-bis-(2-chloroaniline), dilactate of hexamethylene-diamine, maleate of tolylene-diamine and a salt of 4,4' - methylene-bis - 2-(chloroaniline) with 2 moles of maleic monoester of polyoxypropylene glycol.

3. A method as in claim 2, wherein the carboxylic acid diamine salt is di-lactate of 4,4'-methylene-bis-(2-chloroaniline).

4. A method as in claim 2, wherein the carboxylic acid-diamine salt is mono-lactate of 4,4' - methylene-bis-(2-chloroaniline).

5. A method as in claim 2, wherein the carboxylic acid-diamine salt is dilactate of hexamethylenediamine.

6. A method as in claim 2, wherein the organic polyisocyanate component is a polyisocyanatepolyol prepolymer having terminal isocyanate radicals.

7. A method as in claim 1 wherein the carboxylic acid salt of diamine is liquid at a temperature of about 0° C.

References Cited

UNITED STATES PATENTS

| | | | |
|---|---|---|---|
| 3,425,964 | 2/1969 | Stanley | 260—2.5 |
| 2,130,947 | 9/1938 | Carothers | 260—501 |
| 2,274,831 | 3/1942 | Hill | 260—78 |
| 2,343,808 | 3/1944 | Schlack | 260—2 |
| 3,170,003 | 2/1965 | Genski et al. | 260—858 |
| 3,249,577 | 5/1966 | Rio et al. | 260—32.6 |
| 3,261,813 | 7/1966 | Ramos | 260—77.5 |
| 3,391,091 | 7/1968 | Considine et al. | 260—2.5 |

DONALD E. CZAJA, Primary Examiner

H. S. COCKERAM, Assistant Examiner

U.S. Cl. X.R.

260—75, 2.5, 37, 501.2